No. 886,601.
PATENTED MAY 5, 1908.
E. F. HAFELFINGER.
FRICTION SPROCKET.
APPLICATION FILED AUG. 29, 1906.
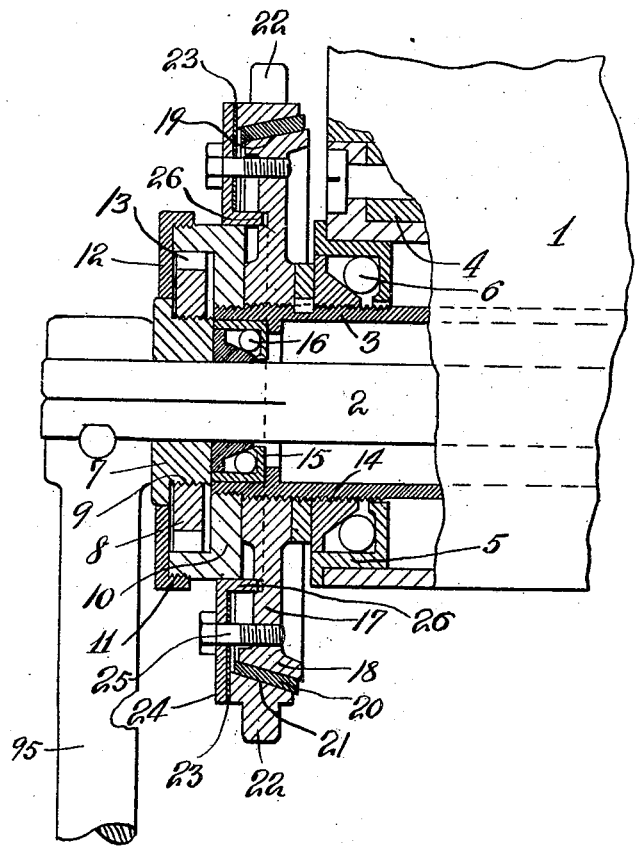
Witnesses
H. Kingsbury
F. H. Logan
Emil F. Hafelfinger, Inventor,
By his Attorney
W. H. Berrigan
THE NORRIS PETERS CO., WASHINGTON, D. C.

UNITED STATES PATENT OFFICE.

EMIL F. HAFELFINGER, OF WEEHAWKEN, NEW JERSEY.

FRICTION-SPROCKET.

No. 886,601.            Specification of Letters Patent.            Patented May 5, 1908.

Application filed August 29, 1906. Serial No. 332,435.

*To all whom it may concern:*

Be it known that I, EMIL F. HAFELFINGER, a citizen of the United States of America, residing at Weehawken, in the county of Hudson and State of New Jersey, have invented a new and useful Friction-Sprocket for Motor-Bicycles, &c.; and I do hereby declare the following to be a full, clear, and exact description of the same.

The present invention especially relates to improvements in sprockets for motor bicycles, automobiles or other self-propelled vehicles, and the primary object thereof is to provide a sprocket having its toothed rim adapted to slip relatively to its web or some other part of the driving connections.

It is well-known that when gearing is employed to transmit motion from a rotary shaft to an axle (for instance), a great strain is thrown upon the gearing when the bicycle or other vehicle is started by the influence of the motor, and there is likelihood of breaking the connections. Thus, for instance, when a motor bicycle is provided with a sprocket driven by a shaft connected with an explosion-engine, and with a chain from said sprocket to another sprocket upon the rear wheel of the bicycle, it frequently results, upon starting the motor, that the chain is snapped or either of said sprockets is stripped of teeth. In order to prevent such accidents, I provide a sprocket having a toothed rim adapted to have a restrained movement independently of the rotation of the driving shaft, and for this purpose I provide the sprocket with friction material between the rim and the web and with means for holding the several parts in constant friction relation.

The accompanying drawing shows one form of my new sprocket connected with the pedal shaft of a motor-bicycle, the sprocket being shown in section.

1 indicates a sleeve comprising the tube 4 usually at the junction of the brace or frame member or members with the bottom front brace 12 of a bicycle (see especially United States Patent No. 682682) granted to me.

2 indicates a rotary shaft, such as a starting shaft, as, for instance, a pedal-shaft, to the opposite ends of which pedal-cranks 95 may be secured in any of the usual ways. The shaft 2 rotatably fits within a sleeve 3, which in turn rotatably fits within the sleeve 1. Antifriction bearings, are interposed between the shaft 2 and the sleeve 3, and between the sleeve 3 and 1, and in the drawings, I have shown balls 6 and 16 for such purposes.

At one side of the bicycle frame, I have provided a lock block 7, surrounding and brazed to the shaft 2; such block 7 is externally threaded, and such exterior threads engage with threads 9 upon the inner walls of one ring or member 8 of a ball or roller clutch, the other member (10) of which is also shown as a ring or washer having threads upon its inner wall in engagement with threads upon the end of sleeve 3. The ball-clutch is shown as provided with a dust-cap 12, secured by threads 11 to the clutch-member 10. Rollers 13 are located between the parts 8 and 10, and either of such parts may be suitably formed to permit the shaft 2 to drive the sleeve 3 only when the shaft moves in the forward direction, and which also permits the sleeve 3 to be moved forwardly by a motor, without contributing movement to the shaft. A form of ball-clutch useful for such purpose is shown in my aforesaid Patent 682682.

In addition to threads 11, already mentioned, the sleeve 3 is also provided with threads 14, and the last-named threads engage with corresponding threads in the interior of the hub of a sprocket, whose web is indicated at 17. Such web is provided with an annular flange or rim 18, and the latter is shown as provided with a tapered or conical face or periphery 19.

A correspondingly-tapered ring 20 of friction material, such as friction metal, surrounds the conical periphery 19 and fits between said face and a conical recess or socket 21 of a sprocket rim surrounding the friction material and provided with radial teeth 22. The friction material 20 may be secured to either the flange 18 or to the sprocket, or be free of both said parts.

A washer or ring-like plate 24 is disposed at one side of the sprocket, and is held in position to be adjustably clamped by the bolts 25, the threaded shanks whereof engage openings in the web 17 of the sprocket, and the heads of which engage the outer face of the washer 24. The inner face of washer 24 is provided with a washer or plate 23 of friction material (such as a friction metal), and the illustrated construction is such that the tightening of washer 24 results in pushing the material 23 against the sprocket-rim 21 and against the conical ring of friction material 20, thus clamping the ring against the conical face or periphery 19 of the web, and holding the rim in clamped relation with the exterior of the ring of frictional material. It is obvious that any desired adjustment and compensation for wear may be assured by tightening any one or more of the bolts 25. It is also obvious that the arrangement of parts shown is one which holds the parts of the sprocket firmly and constantly engaged in frictional relation, permitting however some degree of independent movement of the toothed rim.

The washer 24 is provided with an inwardly-extending edge flange 26 which fits within a recess in the web 17 and concentric to the axis of the sprocket.

Any suitable form of chain may lead from the sprocket teeth 22 and engage directly or indirectly with the rear bicycle-wheel or other propelling wheel.

In operation, when starting the motor, the shaft 2 will first be moved forward, by pedaling or otherwise, and the ball clutch 8—10 will engage and rotate the sprocket and the sleeve 3, the latter operating the fuel and air-supply valves and the ignition apparatus. As soon as the charge is ignited, the sudden starting strain therefrom will be thrown upon the sprocket. The usual jerk thereby imparted to the drive chain and sprocket teeth will not, however, be present in my structure, since, owing to the friction material between the periphery 19 and the toothed rim, there will be enough slipping between the web and the rim, even though tightly held together, to enable the rotation of the sleeve 3 to be somewhat gradually imparted, with a minimum of jerking strains, to the rim and to the chain. It will be obvious, of course, that the rim will also slip in its engagement with the washer 23 of friction material.

When the bicycle or other vehicle has attained sufficient headway, there will be no further slipping of the sprocket rim, and the sleeve 3, sprocket and chain will operate without any unusual give between the parts.

What I claim is:

1. A sprocket having a web provided with a conical periphery, a toothed rim having a conical inner wall, and surrounding said web, friction material between the conical faces of said parts, and means for constantly clamping both parts and the friction member in engagement.

2. A sprocket having a web and a toothed rim separate therefrom, friction material between said hub and said rim and slidably engaging with one of said parts, and means for pulling said two parts in opposite directions and for pushing the friction material between said parts.

In testimony whereof, I have signed my name to this specification in the presence of two subscribing witnesses.

EMIL F. HAFELFINGER.

Witnesses:
   MAX MARTIN,
   FREDERICK BERENBROICK.